June 24, 1930.  R. D. MALM  1,767,220
METHOD OF ELECTRIC WELDING
Filed Dec. 17, 1928
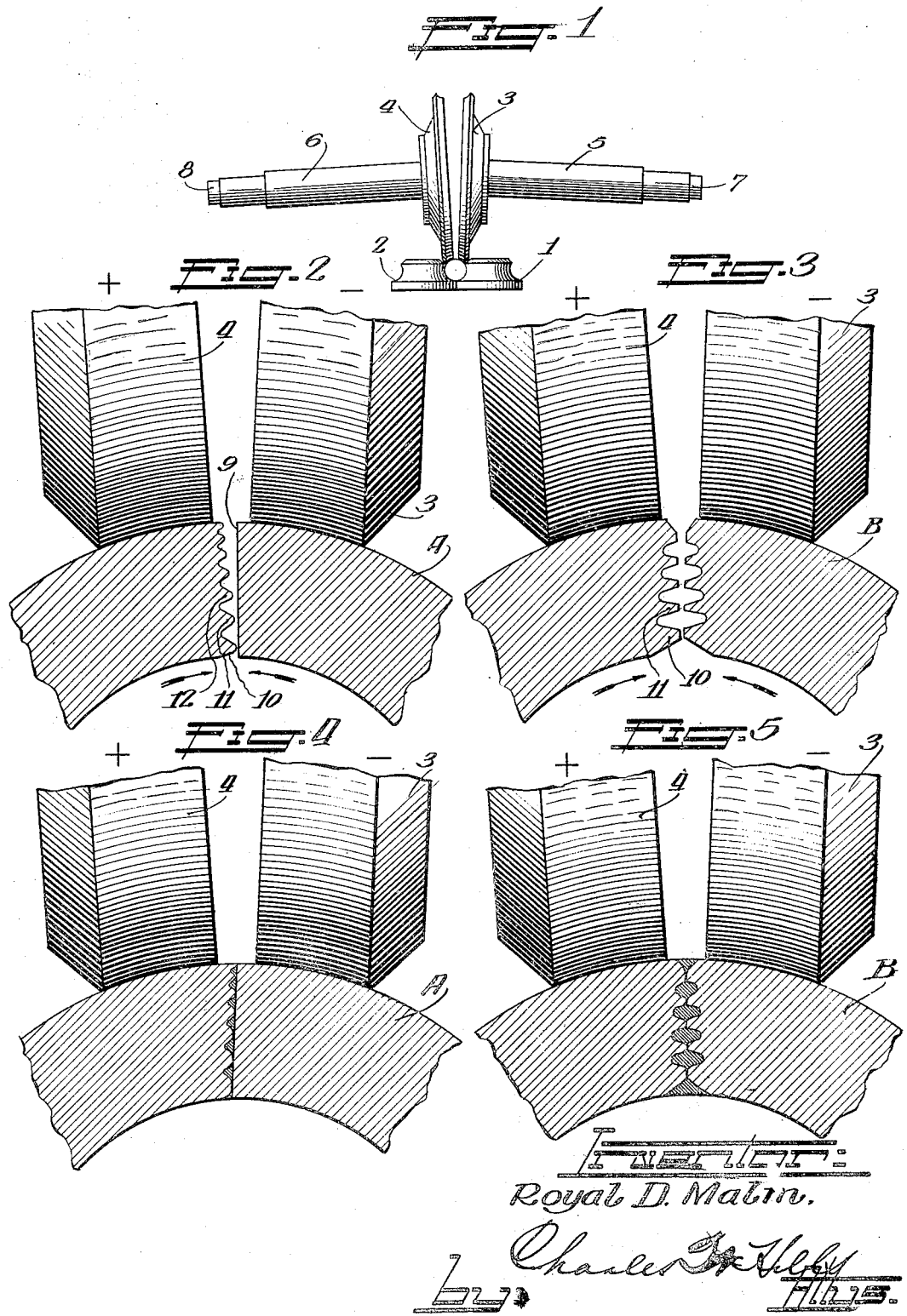
Inventor:
Royal D. Malm.
by Charles T. Helby
Attys.

Patented June 24, 1930

1,767,220

UNITED STATES PATENT OFFICE

ROYAL D. MALM, OF LA GRANGE, ILLINOIS

METHOD OF ELECTRIC WELDING

Application filed December 17, 1928. Serial No. 326,494.

This invention relates to a method of welding and particularly to a method of producing electric butt welds in material such as is used in the manufacture of welded steel tubing.

There are in use at the present time machines for electric welding of steel tubing and of making electric butt welds. However, the methods now employed result in the formation of a burr along the seam on either the outer or inner surface of the same and sometimes on both surfaces, sometimes necessitating a grinding off of the burr.

An object of this invention is to provide a method of electric welding for securing a more perfect butt weld than can be secured at the present time between two flat abutting faces.

Another object of the invention is to provide a method of electric butt welding which leaves no burr at the joint.

A further object of the invention is to provide a method of electric butt welding wherein the faces to be welded make contact progressively from one margin to the other as the welding progresses gradually uniting the faces without excessive heat at any point and without the formation of burrs.

A still further object of the invention is to provide a method of electric butt welding wherein the current is caused to flow through the lower portion of the seam and then progressively flow higher and higher until the current flows through the full depth of the seam with the current density decreasing in value from top to bottom of the seam.

A yet further object of the invention is to provide a method of electric butt welding wherein current consumption and the time elements are decreased and a more perfect weld results.

A further object of this invention resides in the provision of a welding blank in which the faces to be welded are specially constructed to facilitate the welding operation.

The above, other and further objects of the invention will be apparent from the following description, accompanying drawings and appended claims.

According to the invention, the method contemplates providing a face of the blanks to be welded with a plurality of projections or points of uniformly decreasing height from the bottom to the top of the seam and pressing these points progressively to contact with the other face and passing electric current through the other face and the point in contact with the same thereby providing a series of localized intensely heated zones as the projections offer high resistance to the flow of current. This heating softens the projection so that under action of pressure on the blanks the points are progressively mushed and the metal displaced into the spaces, each side of the points without forcing any metal outwardly of the seam to form objectionable burrs.

The accompanying drawings illustrate the use of the method of this invention, which drawings are arranged to provide a butt weld in a tube, although the invention is not limited to the butt welding of tubes alone.

The views of the drawings are as follows:

Figure 1 is a side elevational view of a pair of pressure rolls and a pair of contact rolls arranged for electric butt welding of tubing.

Figure 2 is an enlarged fragmental view of the contacting faces of a blank arranged to be welded in accordance with the method of this invention.

Figure 3 is a view similar to Figure 2 showing both of the contacting faces provided with projections on the same of uniformly decreasing height from the bottom to the top of the seam.

Figure 4 is a fragmental view partially in section showing the appearance of a welded tube which has been welded in accordance with the method of this invention wherein but one of the faces of the blank was provided with projections. The shaded portion in this figure represents the metal displaced from the points of the projections as the two faces of the blank are squeezed or pressed together during welding.

Figure 5 is a fragmental view partially in section of a pipe welded with both contacting faces provided with the ridges of Figure 3.

As shown on the drawings:

This invention is illustrated in connection with the welding of tubing but it is to be understood that it is not limited to the welding of tubing as it of course lends itself readily to the electric butt welding of any other form of blank wherein suitable means are provided for pressing together the contacting faces during the welding process.

The drawings illustrate two pressure rolls 1 and 2 which are arranged on vertical axes to rotate in a manner well understood. The active faces of the rolls are concave to correspond with the convex surface of the blanks being welded which in the present instance is a tube.

Contact rolls 3 and 4 are arranged on spindles 5 and 6 respectively which spindles in turn are supported on shafts 7 and 8. The axes of the shafts 7 and 8 are disposed out of alignment so as to incline the contact rolls 3 and 4 in a manner illustrated for pressing together the contacting faces of the blanks to be welded. The active faces of the rolls 3 and 4 are concave for cooperating with the convex surface of the pipe blanks. The contact rolls 3 and 4 are electric conductors and are suitably connected in a manner not shown for the purpose of supplying electric current to the blanks immediately adjacent the seam to be welded.

The roll 4 is the positive electrode and the roll 3 is the negative electrode.

The blank A of Figure 2 is a tube blank and as illustrated includes a flat contacting surface 9 while the other surface of the blank is provided with a plurality of projections 10, 11, 12, and so on, which projections decrease uniformly in height from the bottom of the seam to the top. The projection 10 which is the lowermost of the series, is pointed inwardly of the inner surface of the pipe blank so that when the point 10 is mushed down as hereinafter explained under influence of electric current and pressure, the metal of the point will be displaced each side of the same without forming a burr on the inner surface of the tube.

The blank A as shown in Figure 2 is in the position immediately prior to or at the moment of the passage of electric current through the pipe line A from the conductor 3 to the conductor 4. The point of the projection 10 is in contact with the lower part of the flat face 9. Pressure is then exerted by movement of the rollers 1 and 2 towards each other to move the faces of the blank in the directions indicated by the arrows in Figure 2, electric current is then passed from the roller 3 to the blank end at the right of the seam and through the point of the projection 10. This first heating occurs near the bottom of the seam and the flow of the current through the points of the projection 10 is of greatest density at the point which results in a localized zone of intense heat. Such heat mushes the projection 10 and the pressure exerted against the blank by the rolls 1 and 2 continually tends to pass the contacting faces of the blank together so that as the point 10 is heated, it is mushed or displaced with the metal flowing each side of the point 10 until the next point 11 contacts the face 9 of the blank. Here again the operation is repeated, that is the flow of electricity is then through the point 11 creating a localized zone of intense heat and likewise mushing the point of the projection 11 so that continuing pressure against the blank A will smooth the ends together until the point of the projection 12 engages the face 9, this then becoming the zone of intense heat. Current will of course continue to flow through the portions welded as just described but with the greatest density of flow through the projections in contact with the flat face 9 of the blank. This continues until the joint or seam is welded from bottom to top whereupon the metal of the points will be displaced as shown by the shaded lines in Figure 4. Provision of the points allow for the formation of recesses each side of the points so that the displaced metal will flow into these recesses and none of it will tend to spread outwardly of the blank forming burrs.

The blank B of Figures 3 and 4 has each of its contacting faces provided with projections and the formation of the welded joint of the blank B is in accordance with the method of welding described with reference to Figures 2 and 4. The formation of the plurality of projections on the two contacting faces of the blank B increases the point connection between these contacting faces thus resulting in localized zones of intense heat so that the time of welding is greatly reduced and consequently the current consumption is also reduced for the reason that the current flows through the points rather than through flat surfaces with the density greatest at the points.

It will be observed that by making the lowermost projection 10 of greatest height, the first heating takes place near the bottom of the seam and progresses towards the top as the several projections are softened and mush and press together as above described. This method of welding lends itself to the butt welding of material of any thickness, the thickness of the material being limited only by the mechanical and electrical capacities of the apparatus available.

The localized heated zone results in a decrease of electric current and a consequent decrease in the time element for welding. A weld made in accordance with this invention is more uniform than that made otherwise as it will be observed there is no excessive heating at any point in the formation of the seam of such nature as to destroy the effectiveness of the weld.

The current employed is alternating current, preferably of commercial voltage and frequency, which may be transformed, regulated and varied in frequency to furnish the proper current and voltage to meet various requirements of welding.

It will be observed that this method of welding lends itself readily to the electric butt welding of material of any thickness and of any size and arrangement. The invention has been illustrated in connection with the butt welding of a pipe or tube but is not limited to tube welding only. The only limitation is to the class or kind of welding that may be accomplished by this method.

This method lends itself very readily in connection with the welding of steel tubing, using a machine such as that disclosed in Patent No. 658,741 to Parpart, modified of course to meet present conditions as to size of pipe and thickness of wall.

Projections 10, 11, 12, and the like, and the contacting face of the blank may be made in any suitable manner such as by a knurling tool or roll of suitable shape and design.

The projections are so fashioned that the ones near the lower portion of the seam will project beyond the normal face of the blank prior to the formation of the projections so that when the points are mushed and pressed together and the metal displaced as above described, the completed welded article will be of proper size and not decreased beyond the proper size by reason of the deformation and displacement of the metal forming the points of the several projections.

The contacting faces to be welded will be referred to in the claims as contacting or mating faces.

The invention has been described herein more or less precisely, yet it is to be understood that changes may be made in the arrangement and sequence of events and equivalents may be substituted without departing from the spirit and scope of the invention.

The invention is claimed as follows:

1. A method of welding a seam in tubular blanks which comprises forming a plurality of projections on an opposed edge of said seam which projections decrease in height from the bottom to the top of the seam, forcing said projections progressively against the other opposed edge of said seam, and passing an electric current through said latter edge and the projections in engagement with the same.

2. A method of electric butt welding a seam in tubular blanks which comprises providing an opposed edge of said seam with a plurality of projections of uniformly decreasing heights, subjecting the blank to pressure along the seam with the most pronounced of said projections against the other opposed edge of said seam, and then subjecting the joint to pressure and a welding heat.

3. A method of electric butt welding a seam in heavy tubular blanks which comprises providing an opposed edge of said seam blank with a plurality of projections of uniformly decreasing height from the bottom of the seam to the top, subjecting the blank to pressure along the seam with the most pronounced of said projections against the other opposed edge of said seam, subjecting the seam to a welding heat, and subjecting the seam to pressure during the continuance of the heat.

4. A method of welding a seam in tubular blanks which comprises providing an opposed edge of said seam with a plurality of projections of uniformly decreasing heights across said edge subjecting the blank to pressure along the seam with the most pronounced of said projections against the other opposed edge of the seam, and then subjecting the joint to pressure and a welding heat.

5. A process of welding a seam in tubular blanks which comprises providing both opposed edges of said seam with a plurality of projections of uniformly decreasing heights, across said faces, subjecting the blank to pressure along said seam with the most pronounced of the projections in contact and then subjecting the joint to pressure and a welding heat.

6. As a new article of manufacture, a welding blank comprising a metal plate having on a face of an edge to be welded a plurality of projections of uniformly decreasing heights across said face.

7. As a new article of manufacture, a welding blank comprising a metal plate having on a face of an edge to be welded a plurality of longitudinally extending projections of uniformly decreasing heights across said face.

8. As a new article of manufacture, a welding blank comprising a metal plate having on the opposed faces of the edges to be welded a plurality of projections of uniformly decreasing heights across said faces.

9. As a new article of manufacture, a welding blank comprising a metal plate having on the opposed faces of the edges to be welded a plurality of longitudinally extending projections uniformly decreasing in height across said faces.

10. As a new article of manufacture, a welding blank having on a face of an edge to be welded a plurality of projections of uniformly decreasing heights across said face, the largest and smallest of said projections being tapered from the outer edges of said face whereby when said face is placed in contact with a mating face, said tapered projections form therewith outwardly opening grooves.

11. As a new article of manufacture, a welding blank comprising a metal sheet having on the opposed faces of the edges to be welded a plurality of projections of uniformly decreasing heights across said faces, the outermost projections being tapered from the outer edges of said faces whereby when said tapered projections are placed in contact they form V-shaped grooves.

In testimony whereof I have hereunto subscribed my name at Chicago, Cook County, Illinois.

ROYAL D. MALM.